Oct. 8, 1957 W. V. WHITNEY 2,808,953
TRAILER FOR TRANSPORTING AND LAUNCHING BOATS
Filed June 15, 1956 2 Sheets-Sheet 2

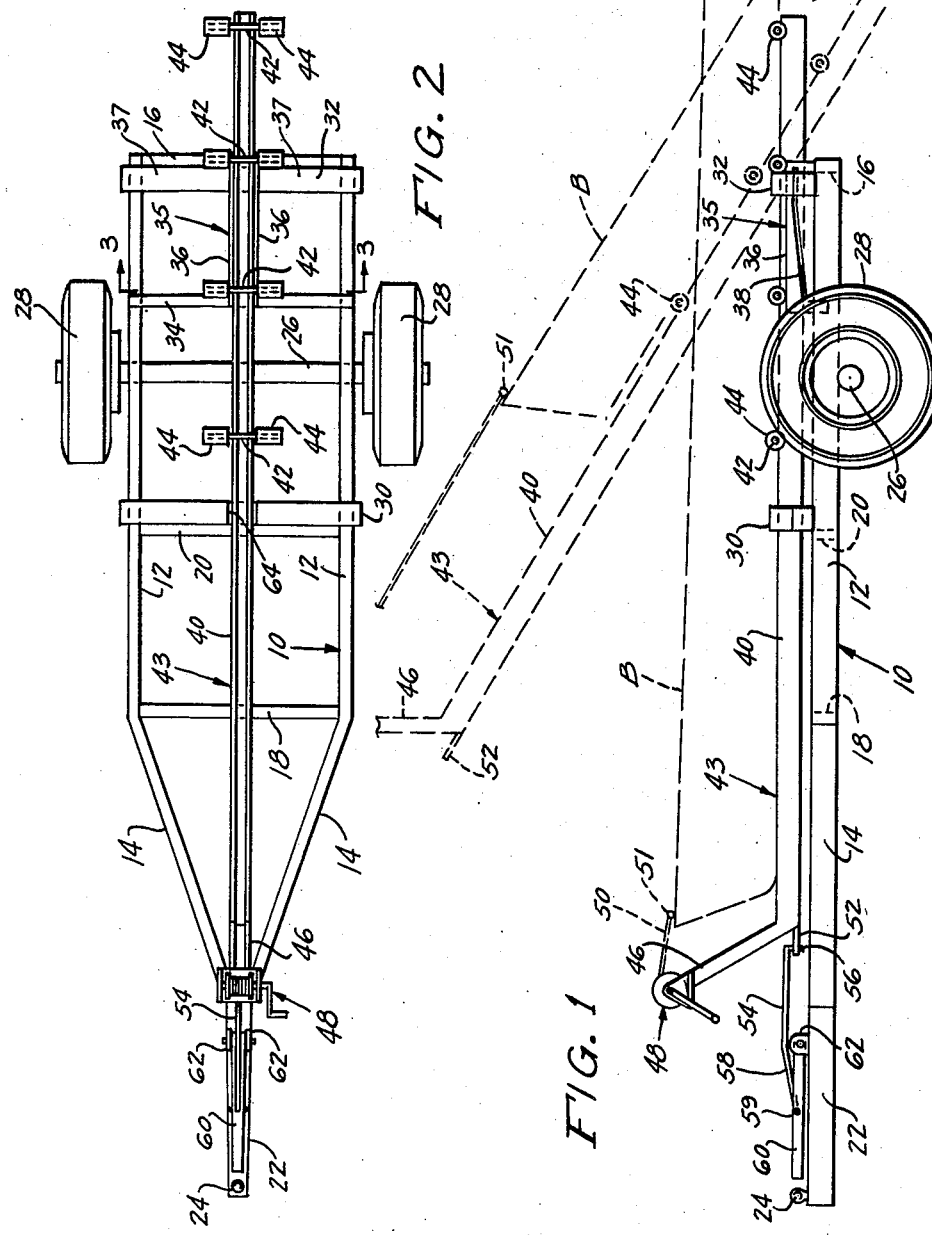

INVENTOR.
WILLIAM V. WHITNEY
BY
McMorrow, Berman & Davidson
ATTORNEYS

United States Patent Office 2,808,953
Patented Oct. 8, 1957

2,808,953
TRAILER FOR TRANSPORTING AND LAUNCHING BOATS

William Vernon Whitney, Des Moines, Iowa

Application June 15, 1956, Serial No. 591,681

1 Claim. (Cl. 214—505)

This invention relates generally to the class of trailers known as boat trailers. More particularly, the invention has reference to a trailer that is novelly designed for facilitating the loading, transporting, and launching of boats, particularly small boats such as row boats, skiffs, small cabin cruisers, etc.

The main object of the invention is to provide a generally improved trailer of the type referred to, that will securely hold the boat in position while the same is being transported, but will be especially suited for making easy the task of loading the boat upon the trailer, or alternatively, of launching the boat directly from the trailer into a body of water.

Another object of importance is to provide a boat trailer so designed that a tiltable boat support frame, moving to an inclined position whenever the boat is being loaded or launched, will, during the regular transport of the boat, be horizontally disposed in a manner that will afford positive and complete security against accidental tilting of the boat support frame.

Summarized briefly, the invention includes a rollable main frame adapted to be hitched to a traction vehicle. An elongated boat support frame is formed with a fulcrum pin slidably and rotatably engaged at its ends in inclined slots provided in the main support frame. On shifting of the boat support frame longitudinally of the main frame, the pins travel toward the lower, inner ends of the slots, and in these circumstances the rear end portion of the boat support frame bears against the rear end of the main frame in a manner to prevent tiltable movement of the boat support frame. Quickly releasable locking means is provided for insuring against accidental rearward sliding movement of the boat support frame relative to the main frame at this time.

The invention, further summarized, includes a cooperating arrangement between the slot and the boat support frame which, on unlocking of the boat support frame, permits the same to be shifted rearwardly, longitudinally of the main frame, while being lifted to a slight degree due to the inclination of the slots. At the rear end of its travel, the boat support frame is freed for tiltable movement, to permit loading or launching of the boat, and is provided with a winch at its forward end facilitating the movement of the boat onto or off of the boat support frame. The shifting of the boat support frame to its rear position for tilting thereof locates its fulcrum point such as to facilitate rocking of the same upon the main frame, due to the fact that it approaches a state of balance at this time. Roller means is provided upon the boat support frame, so that the body may be rolled onto or off the same with maximum ease and without danger of damaging the hull of the boat.

Other objects will appear from the following description, the claim appended thereto, and from the annexed drawing, in which like reference characters designate like parts throughout the several views, and wherein:

Figure 1 is a side elevational view of a boat trailer according to the invention, the boat support frame being shown in full lines in its forward position for transporting of a boat, and in dotted lines in its tilted position for loading or launching of the boat, the boat being shown in dotted lines in both positions;

Figure 2 is a top plan view of the boat trailer per se;

Figure 3:
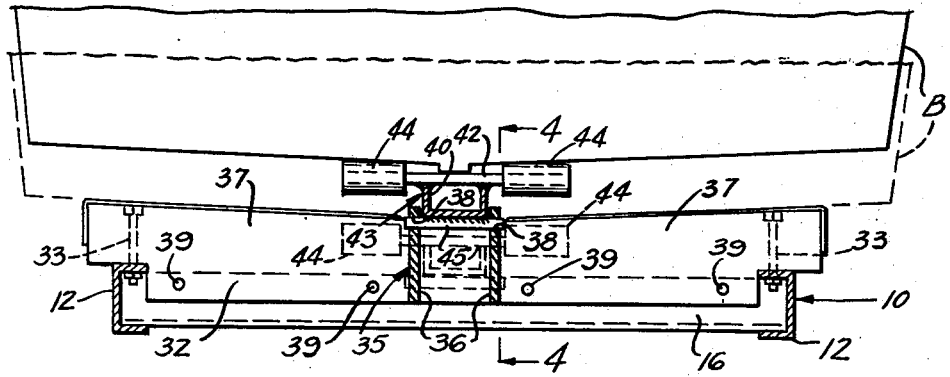
Figure 3 is an enlarged transverse section on line 3—3 of Figure 2, showing the means slidably and pivotally mounting the boat support frame upon the main frame.

Referring to the drawings in detail, a main support frame generally designated 10 includes elongated, straight, laterally spaced, parallel side frame members 12 integral at their forward ends with forwardly converging extensions 14. Extending transversely between the side members at selected locations along the length thereof, and fixedly connected to the side members, are cross braces 16, 18 disposed at the rear and front ends of the side frame members 12, and a cross brace 20 extending between the intermediate portions of said side frame members. Fixedly connected at its aft end between the convergent ends of the extensions 14, and projecting forwardly from the extensions along the longitudinal median of the main support frame, is a tongue 22, provided at its forward extremity with hitch ball 24, for connecting the device to a traction vehicle, not shown. An axle 26 is carried by the intermediate portions of the side frame members, said axle being spaced forwardly a selected distance from the rear end of the main frame and carrying wheels 28.

Spaced longitudinally of the main frame, and extending perpendicularly to and between the side frame members 12, is a pair of bolsters 30, 32. These have angular, downwardly opening recesses at their ends as shown in Figure 3, receiving the side frame members 12, and bolts 33 are employed to fixedly connect the bolsters to the side frame members. The bolsters have top edges shallowly recessed to conform to the cross sectional shape of the underside of the boat B. The bolster 30 may be termed a front bolster, and is located intermediate the opposite ends of the main frame, forwardly of the axle, while the bolster 32 is a rear bolster, and is disposed in closely spaced relation to the rear extremity of the main frame.

Also constituting a component of the main frame is a combined guide and fulcrum assembly for the boat support frame. Said assembly has been shown to particular advantage in Figures 3 and 4. A cross member 34, formed of angle iron material, is welded or otherwise fixedly connected at its ends to and extends transversely between the side frame members 12, at the forward end of the guide and fulcrum assembly, which has been generally designated at 35. Said assembly includes elongated side walls 36, disposed in vertical planes with their front ends supported upon the intermediate portiaon of the cross member 34, and welded or otherwise fixedly connected to said cross member. The walls 36, at their rear ends, are fixedly connected, by welding or the like, to the rear cross member 16. The rear bolster 32, it may be noted, is formed of identical but opposite sections 37, the inner ends of said sections being spaced apart with the rear end portions of the side walls 36 being in face to face contact with the spaced inner ends of the bolster sections 37. The walls 36 may be fixedly secured to said bolster sections 37, and the bolster sections are not only secured to the respective side frame members 12, but are also secured to the rear cross brace 16 by means of bolts 39, thus considerably reinforcing the construction.

Formed in the respective walls 36 are elongated slots 38, disposed at a slight angle to the horizontal plane of the main frame, said slots declining in a forward direction. The slots at their elevated, rear ends, merge into horizontal, short extension slots 41.

Designated generally at 43 is a boat support frame. This is formed as an elongated, straight upwardly opening channel member 40, and welded or otherwise fixedly secured to said channel member, at selected locations along the length thereof, are shafts 42 the ends of which project laterally beyond the opposite sides of the member 40 as shown in Figure 3. Rotatably mounted upon the projecting ends of the shafts 42 are rollers 44 adapted to support the boat B during launching or loading operations.

Welded to the underside of the channel member 40, at a location substantially midway between the midlength point of the channel member and the rear extremity thereof, is a pivot pin 45. This projects at its ends beyond the opposite side walls of the channel members, the projecting ends of the pivot pin slidably and rotatably engaging in the slot 38 having extension 41.

At its forward end, the channel member 40 is integral or otherwise made rigid with an upwardly, forwardly inclining arm 46, and mounted upon the upper end of the arm is a conventional winch generally designated at 48. Coiled about the drum of the winch is a cable 50, connectable to a suitable eye or cleat 51 mounted upon the front end of the boat B.

Welded to and projecting forwardly from the forward end of the channel member 40, below the arm 46, is a clevis plate 52, and forwardly of the clevis plate, a locking link 54 is provided, having at its rear end a depending drop pin 56 engageable in the opening of the plate 52. Link 54 has an inclined forward extension 58 pivotally connected at 59 to the intermediate portion of a locking arm 60 swinging in a vertical plane upon a locking arm support bracket 62 secured fixedly to and extending upwardly from the rear end portion of the tongue 22.

When the boat is being transported, the boat support frame 43 is disposed in a horizontal position, lying in a horizontal plane above and closely spaced from the plane of the main support frame 10. As previously noted, the rear bolster is made in sections, to accommodate the guide and fulcrum assembly 35. The front bolster or cradle 30 has medially between its ends a notch 64 opening upwardly to receive the boat support frame in the lowered position of said boat support frame. The front cradle or bolster can be made in sections to accommodate the boat support frame 43, if desired.

It will be noted that when the boat support frame 43 is in this position, the locking link 54 can be interengaged with the plate 52, after which the arm 60 is swung forwardly, to hold the boat support frame 43 against rearward movement.

On swinging of the locking arm 60 forwardly, the boat support frame 43, if it was not previously shifted to the forward limit of its travel, will be pulled forwardly upon the main frame 10, with the pin 45 sliding in slot 38 to the forward extremity of said slot. This not only causes the boat support frame 43 to move forwardly, but at the same time, causes the same to be dropped to a lower horizontal plane in which it is shown in full lines in Figure 1 and in dotted lines in Figure 4. In this plane, the boat support frame 43 is lowered to such an extent as to cause the rollers 44 to move out of contact with the underside of the boat, so that the boat is now fully supported upon the cradles or bolsters 30, 32, which may be cushioned or otherwise surfaced to prevent damage to the hull. The member 40, in other words, is recessed within the cradles under these circumstances.

It will be seen that the boat is thus securely held, the boat itself being held against slippage relative to the frame 43 by means of the cable 50 and winch 48.

Figure 4:
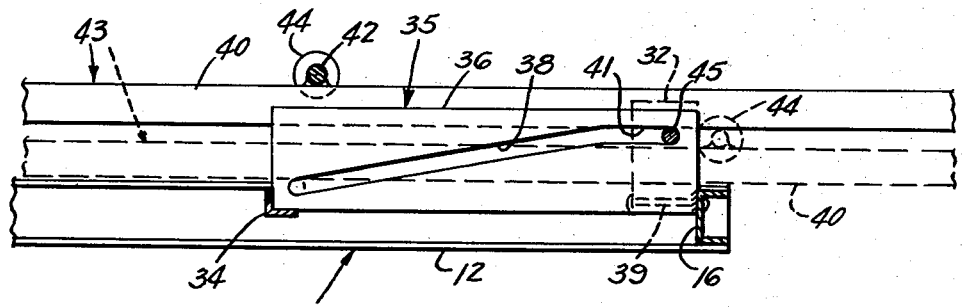
Figure 4 is a fragmentary longitudinal section on an enlarged scale, taken on line 4—4 of Figure 3.
Figure 5:
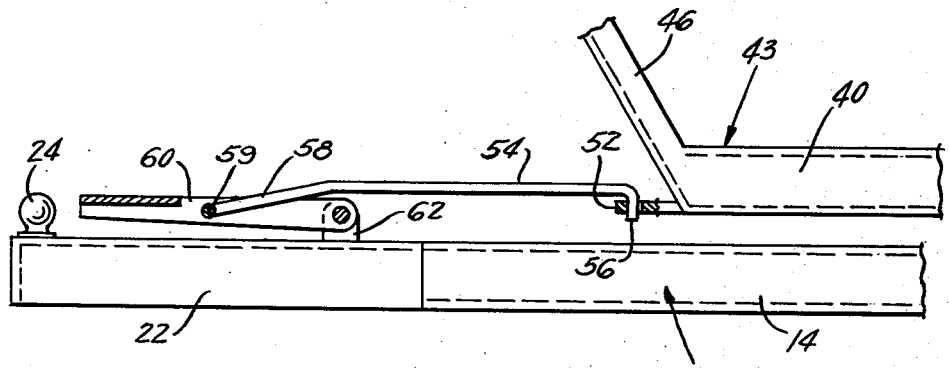
Figure 5 is a fragmentary side elevation of the device with the boat support frame in locked position, portions being shown in section.

Further, the boat support frame 43 cannot accidentally tilt from its boat-transporting position, not only because of the locking engagement between link 54 and plate 52, but also because movement of the pin 45 to the forward end of slot 38 will cause the rear end of the channel member 40 to bear against the rear cross member or cross brace 16 as shown in Figure 4, preventing pivotal movement of the channel member about the axis of its pin 45.

Assuming that the boat is to be launched, the trailer is backed to the edge of the body of water as shown in Figure 1. Then, locking arm 60 is swung upwardly to disengage the link 54 from plate 52. Boat support frame 43 is manually shifted rearwardly, causing pin 45 to ride upwardly within slot 38 to move into the extension 41 as shown in full lines in Figure 4.

This rearward movement of the boat support frame causes a substantial part of its weight to be disposed rearwardly of its pivot axis, balancing the boat support frame 43 upon said pivot axis to a considerable extent, thus to facilitate its being manually rocked upwardly at its front end to the dotted line position of Figure 1. Then, the winch is operated to permit the boat to slide rearwardly off the boat support frame, said boat rolling upon the several rollers 44 and being thus launched into the body of water.

Loading of the boat upon the device is effected in the reverse manner, with the boat being pushed upwardly upon the boat support frame and the boat support frame then being rocked counterclockwise in Figure 1 back to is boat transporting position, to be thereafter longitudinally shifted forwardly of the main frame and locked in this position.

It will be seen that the trailer not only facilitates loading and launching of boats, but also insures that the boat will be securely supported when in transport. When the boat is in transport, it will be supported upon the wide, shallowly recessed cradle 30, 32, thus preventing lateral tilting of the boat from its supported position.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A boat trailer comprising a tractable, rollably supported main frame including a plurality of transversely extending cradles spaced longitudinally of the main frame, and a guide and fulcrum assembly extending longitudinally of the main frame and having longitudinal, forwardly declining slots; a boat support frame including a transverse pin engaged in said slots for sliding movement and for rotational movement, said boat support frame on sliding of the pins to the forward ends of the slots shifting longitudinally of the main frame to a boat-transporting position, the boat support frame on sliding of the pin to the rear ends of the slots being disposed in a boat-launching position and being swingable when in the boat-launching position about the axis of the pin, said boat support frame when in its boat-transporting position being recessed responsive to downward travel of the pin during its movement to the forward ends of the slots in said assembly and cradles, for supporting the boat on the main frame in the boat-transporting position of the boat support frame; winch means on the boat support frame for controlling movement of a supported boat in a direction longitudinally of the boat support frame; and locking means on the main frame adapted for engaging the boat support frame in the boat-transporting position of the boat support frame, the boat support frame including a plurality of rollers spaced longitudinally thereof and supporting the boat during movement of the boat onto and off of the boat support frame, said rollers shifting to positions below the top surfaces of the cradles in the boat-transporting position of the boat support frame, to shift the weight of the boat onto said cradles.

References Cited in the file of this patent

UNITED STATES PATENTS

| | | |
|---|---|---|
| 1,538,052 | Mueller | May 19, 1925 |
| 1,885,399 | Wren | Nov. 1, 1932 |
| 2,485,793 | Vassar | Oct. 25, 1949 |
| 2,700,480 | Triplett | Jan. 25, 1955 |
| 2,713,951 | Davies | July 26, 1955 |

FOREIGN PATENTS

| | | |
|---|---|---|
| 496,549 | Great Britain | Nov. 28, 1938 |